(12) United States Patent
Toyama et al.

(10) Patent No.: US 10,008,305 B2
(45) Date of Patent: Jun. 26, 2018

(54) WIRE HARNESS

(71) Applicant: YAZAKI CORPORATION, Minato-ku, Tokyo (JP)

(72) Inventors: Eiichi Toyama, Kosai (JP); Shigemi Hashizawa, Kosai (JP)

(73) Assignee: YAZAKI CORPORATION, Tokyo (JP)

(*) Notice: Subject to any disclaimer, the term of this patent is extended or adjusted under 35 U.S.C. 154(b) by 259 days.

(21) Appl. No.: 14/497,592

(22) Filed: Sep. 26, 2014

(65) Prior Publication Data

US 2015/0008033 A1 Jan. 8, 2015

Related U.S. Application Data

(63) Continuation of application No. PCT/JP2013/062865, filed on Apr. 26, 2013.

(30) Foreign Application Priority Data

Apr. 26, 2012 (JP) .................................. 2012-100573

(51) Int. Cl.
*H02G 3/04* (2006.01)
*H01B 7/00* (2006.01)
(Continued)

(52) U.S. Cl.
CPC .......... *H01B 7/228* (2013.01); *B60R 16/0215* (2013.01); *H01B 7/0045* (2013.01);
(Continued)

(58) Field of Classification Search
CPC .... B60R 16/0215; H01B 7/16; H01B 7/0045; H01B 7/228; H01B 7/428; H01R 24/00;
(Continued)

(56) References Cited

U.S. PATENT DOCUMENTS 5,362,255 A * 11/1994 Anhalt ................. H01R 9/0518
29/862
9,112,287 B2 8/2015 Toyama et al.
(Continued)

FOREIGN PATENT DOCUMENTS

EP        1 164 664 A2    12/2001
JP     2004171952 A  *  6/2004
(Continued)

OTHER PUBLICATIONS

Communication from the Japanese Patent Office dated Oct. 27, 2015 in a counterpart Japanese application No. 2012-100573.
(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

A wire harness includes one or more electrically-conducting paths, a tubular shielding member configured to collectively accommodate the electrically-conducting paths, a braided shielding member including a cylindrical braided member and connected to an end of the tubular shielding member, and an annular crimping member including a fixing portion which fixedly connects the braided shielding member and the tubular shielding member by crimping, and a bent portion which is formed by bending an open end of the fixing portion to outside of the fixing portion.

10 Claims, 10 Drawing Sheets

(51) Int. Cl.
  *H01B 7/22* (2006.01)
  *B60R 16/02* (2006.01)
  *H01R 4/20* (2006.01)
  *H01R 9/03* (2006.01)
  *H01R 13/6592* (2011.01)

(52) U.S. Cl.
  CPC ............... *H01R 4/20* (2013.01); *H01R 9/032* (2013.01); *H01R 13/6592* (2013.01)

(58) Field of Classification Search
  CPC . H01R 4/20; H01R 9/05; H01R 9/032; H01R 9/035; H01R 9/0518; H01R 13/58; H01R 13/59; H01R 13/648; H01R 13/658; H01R 13/5845; H01R 13/6592; H01R 24/02; H01R 43/00; H01R 105/00; H01R 2103/00; H02G 3/00; Y10T 29/49183; Y10T 29/53243
  USPC .................. 174/665, 72 A, 98; 29/862, 755; 439/582, 607.41
  See application file for complete search history.

(56) References Cited

U.S. PATENT DOCUMENTS

| | | | |
|---|---|---|---|
| 2002/0006743 | A1 | 1/2002 | Kanagawa et al. |
| 2003/0003805 | A1* | 1/2003 | Yamamoto ............. H01R 9/035 439/607.41 |
| 2004/0099428 | A1* | 5/2004 | Miyazaki ............. H01R 13/655 174/366 |
| 2008/0156516 | A1* | 7/2008 | Watanabe ................ H01B 7/16 174/98 |
| 2010/0000788 | A1 | 1/2010 | Kawase et al. |
| 2010/0263925 | A1* | 10/2010 | Spahic ................... H02G 3/065 174/665 |
| 2012/0210573 | A1 | 8/2012 | Kawase et al. |
| 2012/0211260 | A1 | 8/2012 | Kawase et al. |
| 2012/0312597 | A1 | 12/2012 | Toyama et al. |

FOREIGN PATENT DOCUMENTS

| | | |
|---|---|---|
| JP | 2005-123072 A | 5/2005 |
| JP | 2007-80622 A | 3/2007 |
| JP | 2007-234422 A | 9/2007 |
| JP | 2011-165355 A | 8/2011 |
| WO | 2011/096425 A1 | 8/2011 |

OTHER PUBLICATIONS

Communication dated Feb. 12, 2016 issued by the European Patent Office in counterpart European Patent Application No. 13 723 981.0.

International Search Report dated Jul. 26, 2013 issued in International Application No. PCT/JP2013/062865 (PCT/ISA/210).

Written Opinion dated Jul. 26, 2013 issued in International Application No. PCT/JP2013/062865 (PCT/ISA/237).

Decision of Refusal dated Mar. 15, 2016, issued by the Japanese Intellectual Property Office in counterpart Japanese Application No. 2012-100573.

* cited by examiner

WIRE HARNESS

CROSS REFERENCE TO RELATED APPLICATIONS

This application is a continuation of PCT application No. PCT/JP2013/062865, which was filed on Apr. 26, 2013 based on Japanese Patent Application No. 2012-100573 filed on Apr. 26, 2012, the contents of which are incorporated herein by reference.

BACKGROUND OF THE INVENTION

1. Field of the Invention

The present invention relates to a high-voltage wire harness which is routed in a moving body such as a vehicle.

2. Description of the Related Art

A high-voltage wire harness is used as a member to electrically connect between devices in hybrid or electric vehicles, that is, devices such as a motor unit, an inverter unit or a battery.

A wire harness disclosed in JP-A-2007-80622 includes three electric wires which electrically connects between devices, a metallic pipe which collectively accommodates the three electric wires and collectively shields the three electric wires, a braided member which has a cylindrical shape by braiding metallic wires into a mesh shape and has one end connected to an end of the metallic pipe.

The connection between the metallic pipe and the braided member is performed by covering an outer periphery of the end of the metallic pipe with one end of the braided member, and placing and crimping an annular metallic crimp ring in an overlapped portion between each end of the metallic pipe and the braided member.

By performing the crimping described above, the braided member is sandwiched between an inner peripheral surface of the crimp ring and an outer peripheral surface of the metallic pipe and therefore fixedly connected so as not to be separated from the end of the metallic pipe. Accordingly when the crimping is performed, the braided member is tightened with a strong force by the crimp ring.

SUMMARY OF THE INVENTION

However, in JP-A-2007-80622, since the crimp ring is fixedly connected to the braided member with a strong force when the crimping is performed by the crimp ring from the top of the braided member in an overlapped portion between the end of the metallic pipe and one end of the braided member, there is a possibility that an edge of an open end of the crimp ring bites into the braided member and thus the braided member is damaged. In a case where the braided member is damaged, there is a problem that the braided member is cut when a tensile force is applied to the braided member.

The present invention has been made in view of the above circumstances, and an object of the present invention is to provide a wire harness which is capable of preventing the cutting of a braided shielding member.

A first aspect of the present invention provides a wire harness including: one or more electrically-conducting paths; a tubular shielding member configured to collectively accommodate the electrically-conducting paths; a braided shielding member including a cylindrical braided member and connected to an end of the tubular shielding member; and an annular crimping member including a fixing portion which fixedly connects the braided shielding member and the tubular shielding member by crimping, and a bent portion which is formed by bending an open end of the fixing portion to outside of the fixing portion.

The wire harness may be configured so that the bent portion has a substantially arcuate cross-section without edges.

According to the configuration as mentioned above, the crimping member includes the bent portion which is formed by bending the open end of the fixing portion to the outside. The bent portion is formed by bending the open end to the outside and may have a substantially arcuate cross-section. Thus, the bent portion is formed into a shape without edges.

According to a second aspect of the present invention, the wire harness may be configured so that the braided shielding member is disposed so as to surround an end of the electrically-conducting paths extending from the end of the tubular shielding member by connecting one end of the braided shielding member to the end of the tubular shielding member, crimping the crimping member at a position of the one end and then reversely folding-back the other end of the braided shielding member in the position crimped by the crimping member, and the bent portion is disposed on a side of the braided shielding member to be folded-back when crimping the crimping member.

According to the configuration as mentioned above, the braided shielding member is disposed so as to surround the end of the electrically-conducting path extending from the end of the tubular shielding member by connecting one end of the braided shielding member to the end of the tubular shielding member, crimping the crimping member at the position of the one end and then reversely folding-back the other end of the braided shielding member in the position crimped by the crimping member. Further, the bent portion is disposed on the side of the braided shielding member to be folded-back when crimping the crimping member. The folded-back portion of the braided shielding member is brought into contact with the bent portion when the other end of the braided shielding member in a state of being folded-back is pulled.

According to a third aspect of the present invention, the wire harness may be configured so that the crimping member further includes an extending portion which is provided on an end of the bent portion on a side of the braided shielding member to be folded-back and arranged on the outside of the fixing portion, so that the crimping member has a substantially dog-leg shaped cross-section, a substantially L shaped cross-section, a substantially J shaped cross-section or a substantially crank-shaped cross-section.

According to the configuration as mentioned above, the crimping member includes the extending portion which is provided on the end of the bent portion on the side of the braided shielding member to be folded-back and arranged on the outside of the fixing portion. The crimping member has the substantially dog-leg shaped cross-section, the substantially L shaped cross-section, the substantially J shaped cross-section or the substantially crank-shaped cross-section. The extending portion is disposed on the outside of the fixing portion and therefore the diameter of the extending portion is greater than the diameter of the fixing portion. As a result, the folded-back portion of the braided shielding member is hardly brought into direct contact with the edges of the free end of the extending portion even when the other end of the braided shielding member in a state of being folded-back is pulled.

According to the configuration as in the first aspect or fourth aspect, the bent portion is formed into a shape which has a substantially arcuate cross-section without edges, by bending the open end to the outside. As a result, even when the crimping member is crimped from the top of the braided shielding member and thus fixing is performed by a strong force, the open end is formed as the bent portion and therefore there is no possibility that the braided shielding member is damaged. Accordingly, there is an effect that it is possible to prevent cutting of the braided shielding member.

According to the configuration as in the second aspect, the folded-back portion of the braided shielding member is brought into contact with the bent portion when the other end of the braided shielding member in a state of being folded-back are pulled. Since the bent portion is formed into a shape without edges, there is no possibility that the braided shielding member is damaged even when the folded-back portion of the braided shielding member is brought into direct contact with the bent portion. Accordingly, there is an effect that it is possible to prevent cutting of the braided shielding member.

According to the configuration as in the third aspect, since the extending portion is disposed on the outside of the fixing portion, the diameter of the extending portion is greater than the diameter of the fixing portion. Further, since the crimping members are formed to have the substantially dog-leg shaped cross-section, the substantially L shaped cross-section, the substantially J shaped cross-section or the substantially crank-shaped cross-section, the folded-back portion of the braided shielding member is hardly brought into direct contact with the edges of the free end of the extending portion even when the other end of the braided shielding member in a state of being folded-back is pulled. Particularly, when the crimping members are formed to have the substantially L shaped cross-section and the substantially J shaped cross-section, the braided shielding member does not come into direct contact with the edges of the free end of the extending portion even when the braided shielding member is pulled. As a result, it is possible not only to prevent damage to the portion of the braided shielding member brought into contact with the bent portion but also to mitigate damage to the other portion of the braided shielding member. Accordingly, there is an effect that it is possible to more reliably prevent cutting of the braided shielding member.

DETAILED DESCRIPTION OF THE EXEMPLARY EMBODIMENTS

A wire harness is configured to include one or a plurality of electrically-conducting paths, a tubular shielding member configured to collectively accommodate the electrically-conducting paths, a braided shielding member having one end connected to an end of the tubular shielding member and a crimping member including a fixing portion which fixedly connects the braided shielding member and the tubular shielding member by crimping in the position of the one end of the braided shielding member. The crimping member further includes a bent portion, in addition to the fixing portion.

First Embodiment

Figure 1:
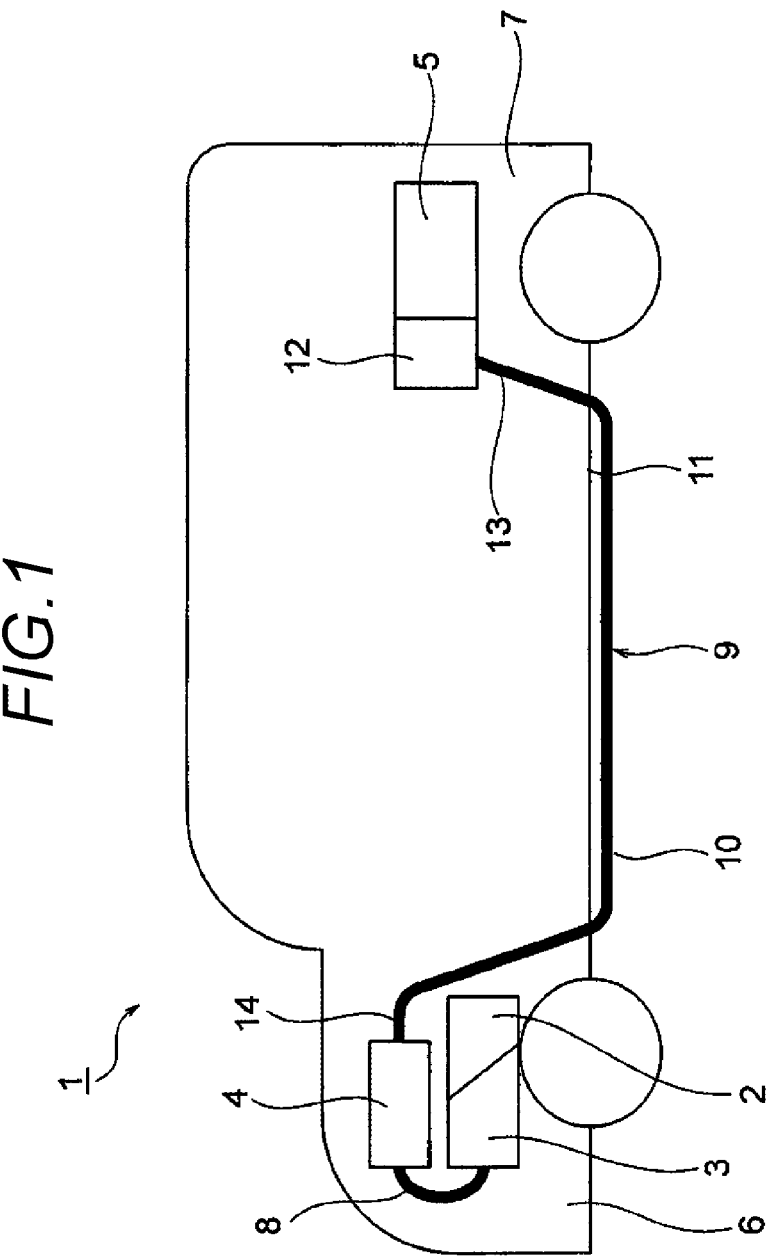
FIG. 1 is a schematic view of a vehicle in which a wire harness is routed.
Figure 2:
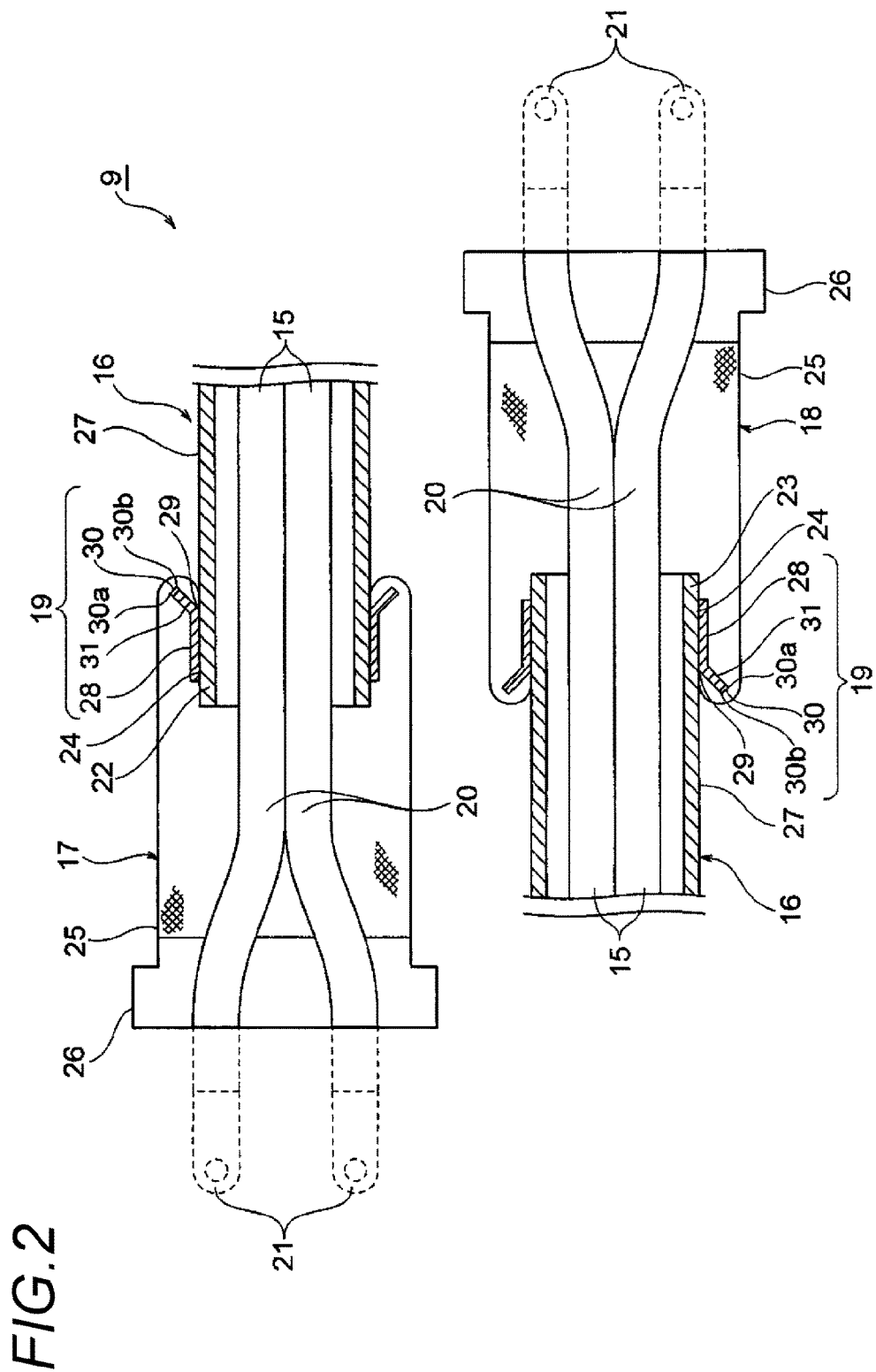
FIG. 2 is a sectional view showing a configuration of the wire harness (First Embodiment).
Figure 3:
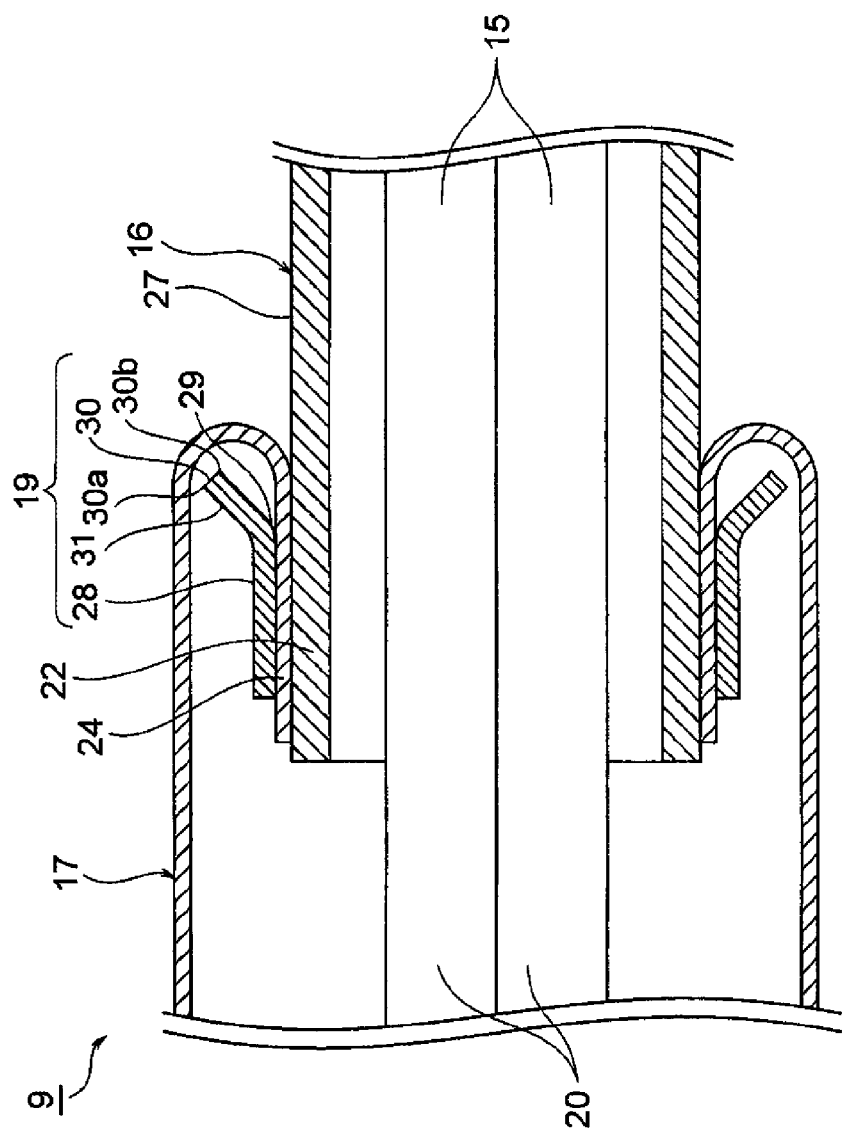
FIG. 3 is an enlarged sectional view showing a configuration of one end of the wire harness shown in FIG. 2.
Figure 4:
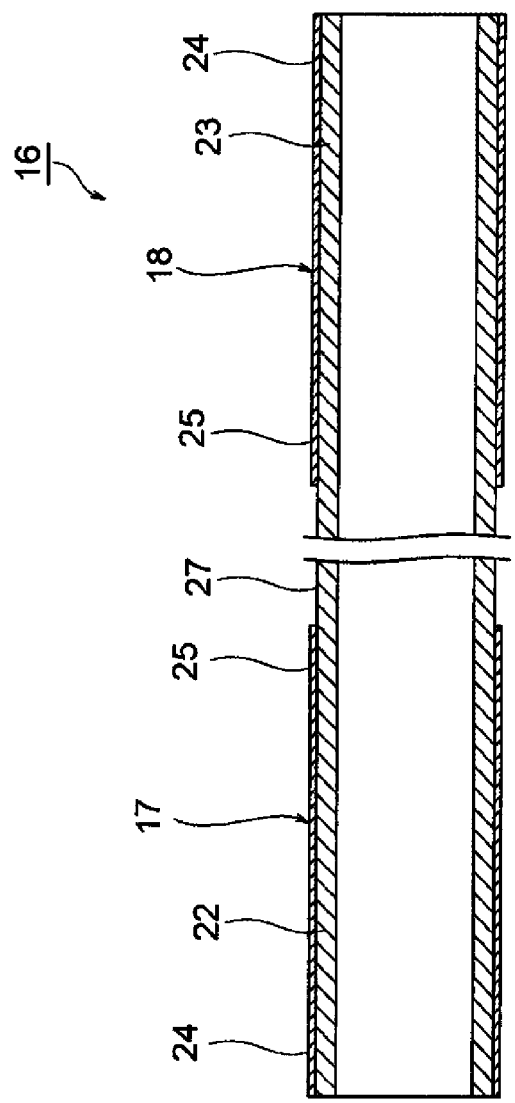
FIG. 4 is an explanatory view for explaining a manufacturing method of the wire harness shown in FIG. 2.
Figure 5:
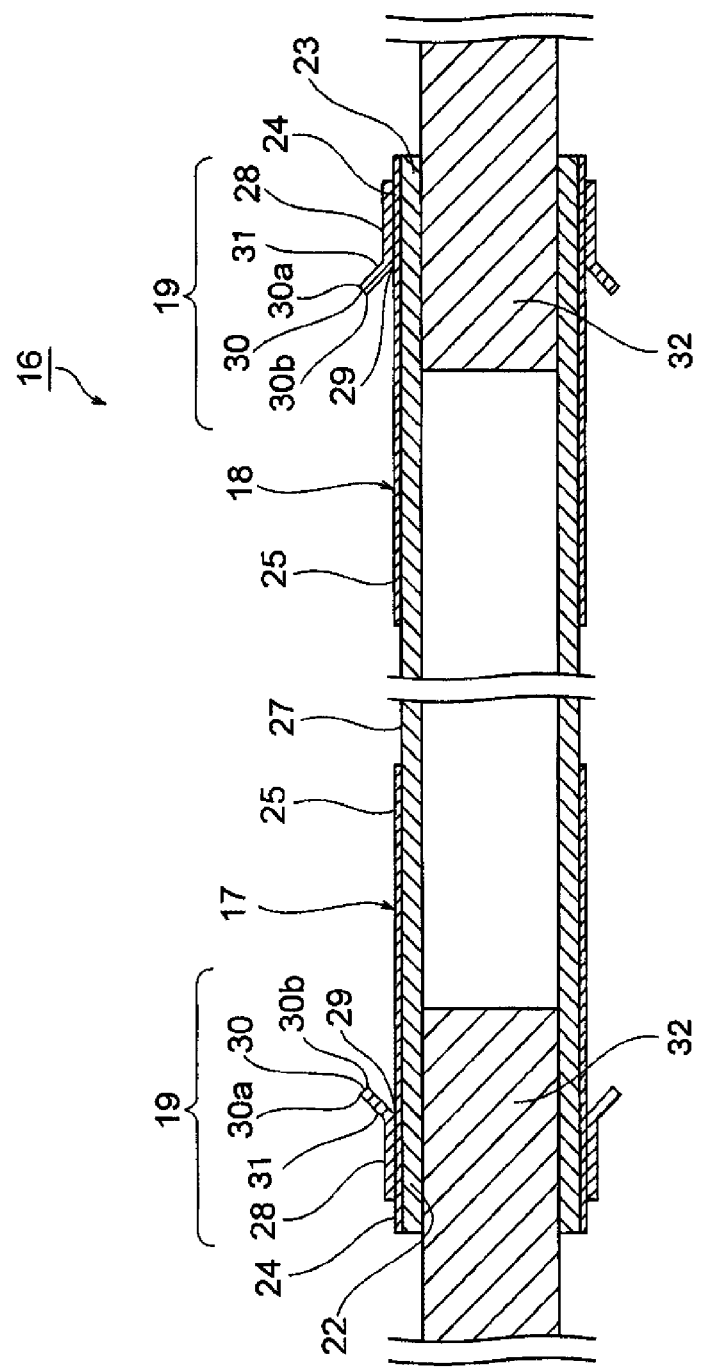
FIG. 5 is a diagram subsequent to FIG. 4.
Figure 6:
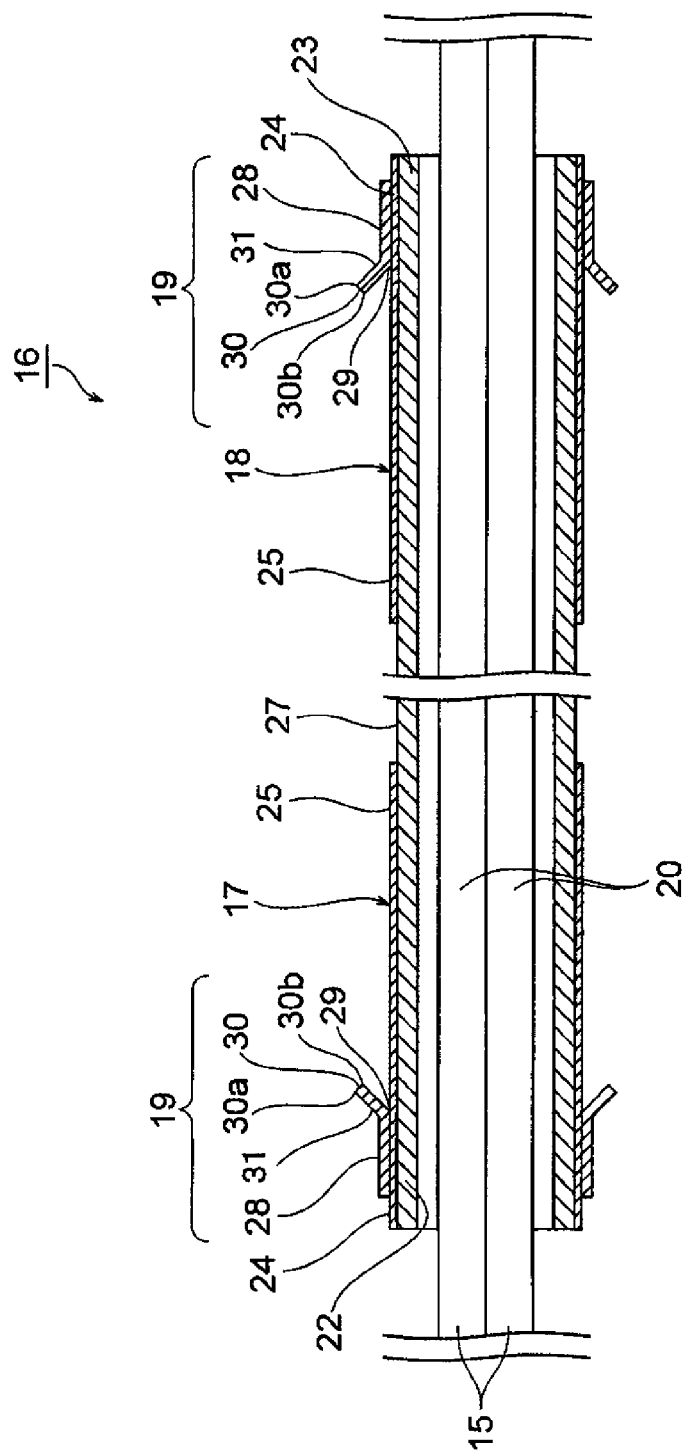
FIG. 6 is a diagram subsequent to FIG. 5.
Figure 7:
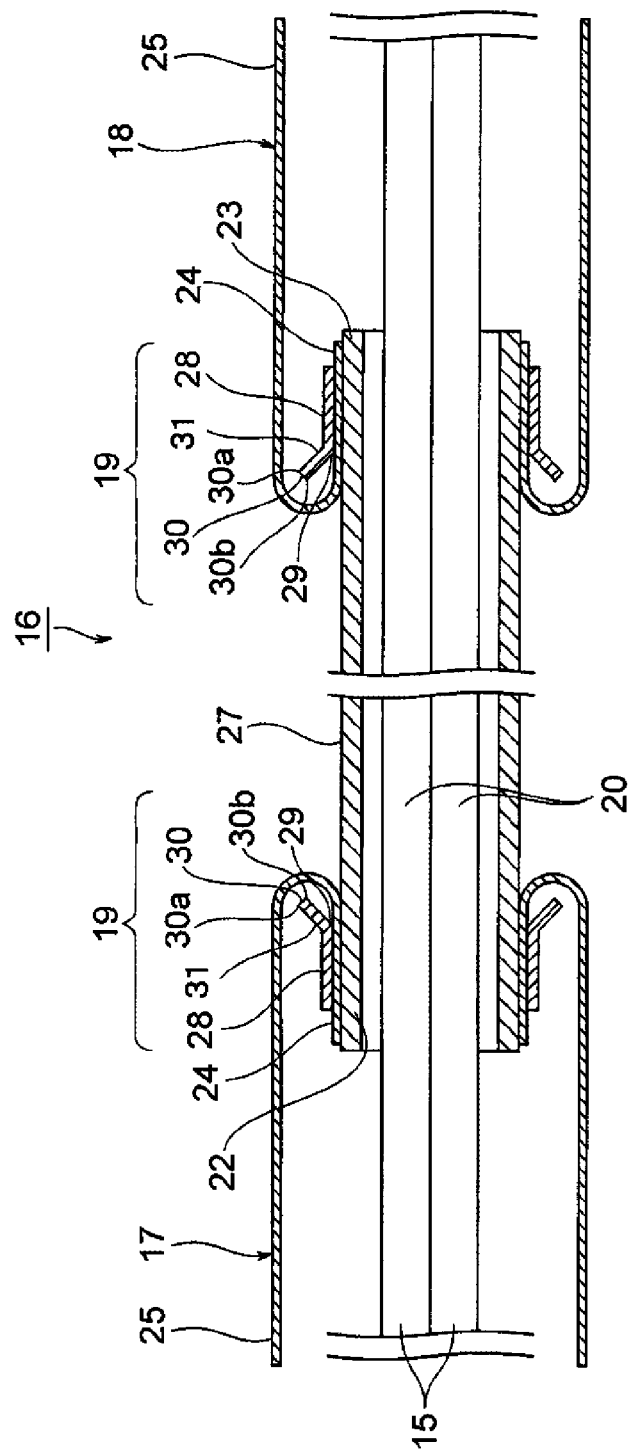
FIG. 7 is a diagram subsequent to FIG. 6.

Hereinafter, a first embodiment will be described with reference to FIGS. 1 to 7. FIG. 1 is a schematic view of a vehicle in which a wire harness according to the first embodiment is routed; FIG. 2 is a sectional view showing a configuration of a wire harness according to a first embodiment of the present invention; FIG. 3 is an enlarged sectional view showing a configuration of one end of the wire harness shown in FIG. 2; FIG. 4 is an explanatory view for explaining a manufacturing method of the wire harness shown in FIG. 2; FIG. 5 is a diagram subsequent to FIG. 4; FIG. 6 is a diagram subsequent to FIG. 5; and FIG. 7 is a diagram subsequent to FIG. 6.

In the following description, specific shape, material, numerical value, direction, etc. are to be illustrative for easier understanding of the present invention and can be appropriately changed in accordance with use, purpose and specifications or the like.

In the present embodiment, a case where a wire harness of the present invention is employed in a hybrid vehicle (or, an electric vehicle) will be described as an example.

In FIG. 1, reference numeral 1 indicates a hybrid vehicle. The hybrid vehicle 1 is driven by a mixed power of an engine 2 and a motor unit 3. Electric power from a battery 5 (battery pack) is supplied to the motor unit 3 via an inverter unit 4. In the present embodiment, the engine 2, the motor unit 3 and the inverter unit 4 are mounted on an engine room 6 located at a position where front wheels, etc., are provided. Further, the battery 5 is mounted on a vehicle rear portion 7 located at a position where rear wheels, etc., are provided. The battery 5 may be mounted on a vehicle interior which is provided in the rear of the engine room 6.

The motor unit 3 and the inverter unit 4 are connected to each other by a known high-voltage wire harness 8. Further, the battery 5 and the inverter unit 4 are connected to each other by a wire harness 9 of the present embodiment. The wire harness 9 is configured as a high-voltage wire harness. A middle portion 10 of the wire harness 9 is routed in a ground side of a vehicle body floor 11. The vehicle body floor 11 is a known body and also so-called a panel member. A through-hole (reference numeral is omitted) is formed through a predetermined position of the vehicle body floor 11.

The wire harness 9 and the battery 5 are connected to each other via a junction block 12 which is provided in the battery 5. A rear end 13 of the wire harness 9 is connected to the junction block 12 via a connector. A front end 14 of the wire harness 9 is connected to the inverter unit 4 via a connector. The middle portion 10 of the wire harness 9 is routed substantially parallel along the vehicle body under floor 11.

The motor unit 3 is configured to include a motor and a generator. Further, the inverter unit 4 is configured to include an inverter and a converter. The motor unit 3 is formed as a motor assembly including a shield casing. Further, the inverter unit 4 is also formed as an inverter assembly including a shield casing. The battery 5 is a Ni-MH based or Li-ion based battery and configured as a module. In addition, an electrical storage device such as a capacitor may be used, for example. The battery 5 is not particularly limited, as long as the battery 5 can be used in the hybrid vehicle or an electric vehicle.

Hereinafter, the wire harness 9 will be described as an example of the present invention. The present invention is not limited to the wire harness 9 but can be applied to the high-voltage wire harness 8. The wire harness 9 is intended for electrically connecting the inverter unit 4 and the battery 5 (see FIG. 1). As shown in FIG. 2 and FIG. 3, the wire harness 9 is configured to include two high-voltage electric wires (electrically-conducting path) 15, a tubular shielding member 16 to collectively accommodate these two high-voltage electric wires 15, two braided shielding members 17, 18 connected to both ends of the tubular shielding member 16 and a crimping member 19 to fixedly connect the tubular shielding member 16 and the braided shielding members 17, 18.

As shown in FIG. 2 and FIG. 3, two high-voltage electric wires 15 are provided in the present embodiment (the number of the electric wires is considered as an example). The high-voltage electric wire 15 is a high-voltage electrically-conducting path including a conductor and an insulator (covering) 20 and formed to have a length required for electric connection. The conductor (not shown) is produced by copper or copper alloy, aluminum or aluminum alloy. The conductor may have a conductor structure consisting of wires stranded together or a rod-shaped conductor structure (for example, a conductor structure of a rectangular single core or a circular single core and, in this case, the electric wire itself has a rod shape) having a rectangular cross-section or a circular cross-section.

Although the high-voltage electric wire 15 has been employed as the electrically-conducting path in the present embodiment, the present invention is not limited to this configuration. That is, a high-voltage electrically-conducting path which is configured by providing an insulator in a known busbar may be used or a high-voltage coaxial composite electrically-conducting path or the like which is configured by coaxially arranging n-system circuit (n circuits) into a single electrically-conducting path may be used.

In addition, as an example of the high-voltage coaxial composite electrically-conducting path, an electrically-conducting path can be employed which includes one conductor of a positive electrode conductor and a negative electrode conductor, one insulator provided to cover the outside of the one conductor, the other conductor of the positive electrode conductor and the negative electrode conductor provided to cover the outside of the first insulator and a second insulator provided to cover the outside of the other conductor. The electrically-conducting path is entirely configured as a single electrically-conducting path.

The insulators 20 are removed by a predetermined length in both end parts of the high-voltage electric wires 15. The conductor (not shown) is exposed through the removed portion. The exposed conductor is connected to a terminal fitting 21 (see FIG. 2). The terminal fitting 21 is provided as a part which is connected to a connection portion (not shown) of the inverter unit 4 and also connected to a connection portion (not shown) of the battery 5.

The tubular shielding member 16 is configured by forming a conductive metal (for example, iron, aluminum, copper, or stainless) into a shape of a tubular body with a circular cross-section. As shown in FIG. 2 and FIG. 3, the tubular shielding member 16 is formed to have a size (diameter) and a length which can cover a predetermined range of two high-voltage electric wires 15.

In FIG. 2, one braided shielding member 17 is provided as a member connected to the inverter unit 4 (see FIG. 1) and the other braided shielding member 18 is provided as a member connected to the battery 5 (see FIG. 1). One end portion 22 of the tubular shielding member 16 is connected to the braided shielding member 17 and the other end portion 23 thereof is connected to the braided shielding member 18.

The braided shielding members 17, 18 are formed as a cylindrical member (a shielding member for protection against the electromagnetic wave) for electromagnetic shielding. Further, the braided shielding members 17, 18 are formed to have a size which can cover a predetermined range of two high-voltage electric wires 15 (see FIG. 2). One ends 24 of the braided shielding members 17, 18 are electrically connected to the ends 22, 23 of the tubular shielding member 16 and the other ends 25 thereof are electrically connected to a shield shell 26. The braided shielding members 17, 18 are formed by using a plurality of ultrafine conductive wires and braiding the ultrafine conductive wires into a net form. Ultrafine wires consisting of metal wires such as soft copper can be used as the wires.

In the present embodiment, the shield shell 26 is intended to use a metallic shield shell. The connection of the shield shell 26 and the other ends 25 of the braided shielding members 17, 18 is performed by crimping the connection locations of the shield shell 26 and the braided shielding members 17, 18 by a shield ring (not shown), for example. Here, the crimping is considered as an example. Instead of the crimping, the connection can be performed by using a method such as welding, bonding, adhesion and soldering in the connection portions of the shield shell 26 and the braided shielding members 17, 18, for example.

As shown in FIG. 2 and FIG. 3, the braided shielding members 17, 18 are disposed so as to surround the end of the high-voltage electric wire 15 extending from the ends 22, 23 of the tubular shielding member 16 by crimping the connection portions of one ends 24 of the braided shielding members 17, 18 and the ends 22, 23 of the tubular shielding member 16 by the crimping member 19 and then reversely folding-back the other ends 25 of the braided shielding members 17, 18 in the crimped positions.

The crimping member 19 is so-called a crimp ring made of metal (for example, iron, aluminum, copper, or stainless, etc.) and formed in a continuous annular form around the entire circumference, as shown in FIG. 2 and FIG. 3. The crimping member 19 includes a fixing portion 28 for fixedly connecting the tubular shielding member 16 and the braided shielding members 17, 18 by crimping, a bent portion 29 formed by bending an open end of the fixing portion 28 to the outside and an extension portion 31 which is continuous with the bent portion 29 and located on the outside of the fixing portion 28.

The fixing portion 28 has a substantially constant diameter and is formed in a cylindrical shape which is concentric with the tubular shielding member 16. The crimping member 19 is crimped in such a way that the connection portions of an outer surface 27 in the ends 22, 23 of the tubular shielding member 16 and the braided shielding members 17, 18 are clamped by the fixing portion 28.

The bent portion 29 is formed by bending and widening the open end of the fixing portion 28 to the outside of the fixing portion 28. This is considered as an example. Instead of this, the bent portion 29 may be configured in such a way that the open end of the fixing portion 28 is naturally bent by crimping the crimping member 19. The bent portion 29 may be formed into a shape of so-called a bell mouth. With the above configuration, the bent portion 29 is formed into a shape which has a substantially arcuate cross-section without edges. The bent portion 29 is disposed on the side of the braided shielding members 17, 18 to be folded-back when crimping the crimping member 19.

The extending portion 31 is provided continuous to an end of the bent portion 29 on the side of the braided shielding members 17, 18 to be folded-back and disposed more outward than the fixing portion 28. The extending portion 31 has one end continuous to the bent portion 29 and the other end being a free end 30. The free end 30 is provided with edges 30a, 30b. In the present embodiment, although the folded-back portion of the braided shielding members 17, 18 does not come into contact with the bent portion 29 and the edges 30a, 30b of the free end 30 of the extending portion 31, as shown in FIG. 2 and FIG. 3, the present invention is not limited to this configuration. The folded-back portion may come into contact with the bent portion 29 and the edges 30a, 30b.

With the above configuration, the crimping member 19 in the present embodiment is formed to have a substantially dog-leg shaped cross-section (this is considered as an example). In addition, at least the bent portion 29 is essential but the setting of the extending portion 31 is optional.

Next, a manufacturing method of the wire harness 9 according to the present embodiment will be described with reference to FIG. 4 to FIG. 7. First, as shown in FIG. 4, the one ends 24 and the other ends 25 of the braided shielding members 17, 18 are placed in advance on the tubular shielding member 16 in a state of covering the ends 22, 23 of the tubular shielding member 16.

Next, the one ends 24 of the braided shielding members 17, 18 and the ends 22, 23 of the tubular shielding member 16 are crimped by the crimping member 19. In addition, the crimping operation is performed in advance before the high-voltage electric wire 15 is inserted through the tubular shielding member 16.

In the crimping operation, first, a core 32 is inserted into the interior of the tubular shielding member 16 through the ends 22, 23 in order to secure an inner diameter of the tubular shielding member 16 which allows the high-voltage electric wire 15 to be inserted therethrough, as shown in FIG. 5. In this case, the core 32 to be used has a diameter substantially the same as the inner diameter of the tubular shielding member 16.

Next, the crimping member 19 is placed and crimped on the positions of the one ends 24 of the braided shielding members 17, 18. By doing so, the overlapped portions of the ends 22, 23 of the tubular shielding member 16 and one ends of the braided shielding members 17, 18 are clamped and fixed by the fixing portions 28. Thus, the tubular shielding member 16 and the braided shielding members 17, 18 are electrically connected.

In the above crimping operation, the braided shielding members 17, 18 do not interfere with the insertion of the core 32 and therefore the core 32 can be used. Accordingly, a force required for crimping can be sufficiently applied to perform clamping while maintaining the shape of the open end of the tubular shielding member 16. Further, by using the core 32, it is possible to process the open end of the tubular shielding member 16 into a desired shape (for example, elliptical shape, etc.) simultaneously with crimping. Meanwhile, the core 32 can be used in the crimping operation, as necessary.

Next, as shown in FIG. 6, two high-voltage electric wires 15 are inserted through the inside of the tubular shielding member 16. After the insertion of the high-voltage electric wires 15, the terminal fitting 21 (see FIG. 2) is mounted to an end of the high-voltage electric wires 15 extending from the ends 22, 23 of the tubular shielding member 16.

Next, as shown in FIG. 7, the other ends 25 of the braided shielding members 17, 18 are grasped and the braided shielding members 17, 18 are reversely folded-back in the crimped positions. In order words, the other ends 25 of the braided shielding members 17, 18 are grasped and the braided shielding members 17, 18 are reversely turned. Since the braided shielding members 17, 18 are in a state where one ends 24 thereof are folded-back inward, an operation for cutting the surplus portions of the one ends 24 is not necessary.

The shield shell 26 (see FIG. 2) is connected to the other ends 25 of the braided shielding members 17, 18. The folded-back portions of the braided shielding members 17, 18 can be arranged to surround the ends of the high-voltage electric wires 15. In this way, the wire harness 9 of the present embodiment is completed (see FIG. 2).

According to the present embodiment, the bent portion 29 of the crimping member 19 is formed into a shape which has a substantially arcuate cross-section without edges, by bending the open end of the fixing portion 28 to the outside. As a result, even when the crimping member 19 is crimped from the top of the braided shielding members 17, 18 and thus fixing is performed by a strong force, the open end is formed as the bent portion 29 and therefore there is no possibility that the braided shielding members 17, 18 are damaged. Accordingly, it is possible to prevent cutting of the braided shielding members 17, 18.

Further, according to the present embodiment, the folded-back portions of the braided shielding members 17, 18 are brought into direct contact with the bent portion 29 when the other ends 25 of the braided shielding members 17, 18 in a state of being folded-back are pulled. Since the bent portion 29 is formed into a shape without edges, there is no possibility that the braided shielding members 17, 18 are damaged even when the folded-back portions of the braided shielding members 17, 18 are brought into direct contact with the bent portion 29. Accordingly, it is possible to prevent cutting of the braided shielding members 17, 18.

Further, according to the present embodiment, since the extending portion 31 is disposed on the outside of the fixing portion 28, the diameter of the extending portion 31 is greater than the diameter of the fixing portion 28. Further, since the crimping member 19 is formed to have a substantially dog-leg shaped cross-section, the folded-back portions of the braided shielding members 17, 18 are hardly brought into direct contact with the edges 30a, 30b of the free end 30 of the extending portion 31 even when the other ends 25 of the braided shielding members 17, 18 in a state of being folded-back are pulled. As a result, it is possible not only to prevent damage to the portions of the braided shielding members 17, 18 brought into contact with the bent portion 29 but also to mitigate damage to the other portions of the braided shielding members 17, 18. Accordingly, it is possible to more reliably prevent cutting of the braided shielding members 17, 18.

OTHER EMBODIMENTS

Figure 8:
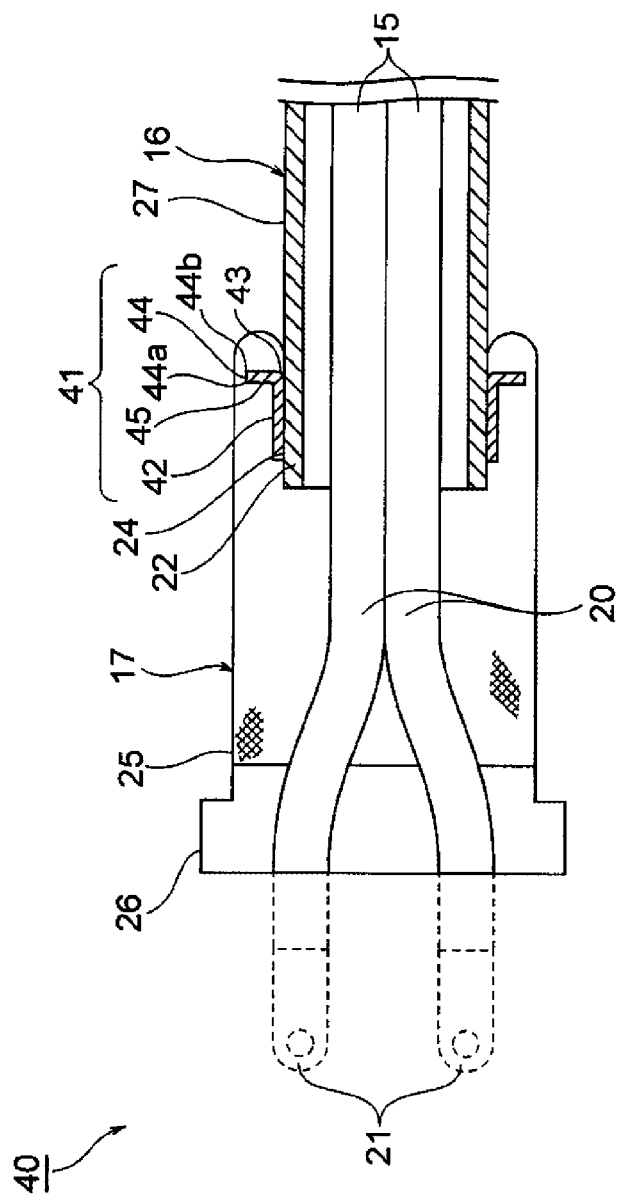
FIG. 8 is a sectional view showing another configuration of one end of the wire harness (Second Embodiment).
Figure 9:
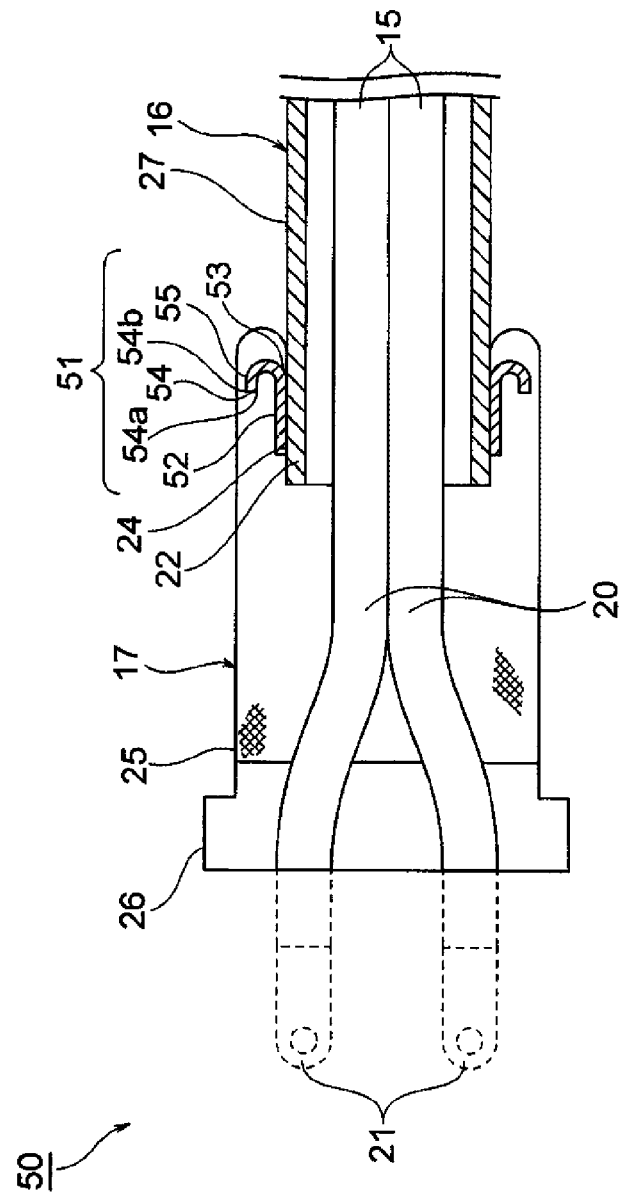
FIG. 9 is a sectional view showing another configuration of one end of the wire harness (Third Embodiment).
Figure 10:
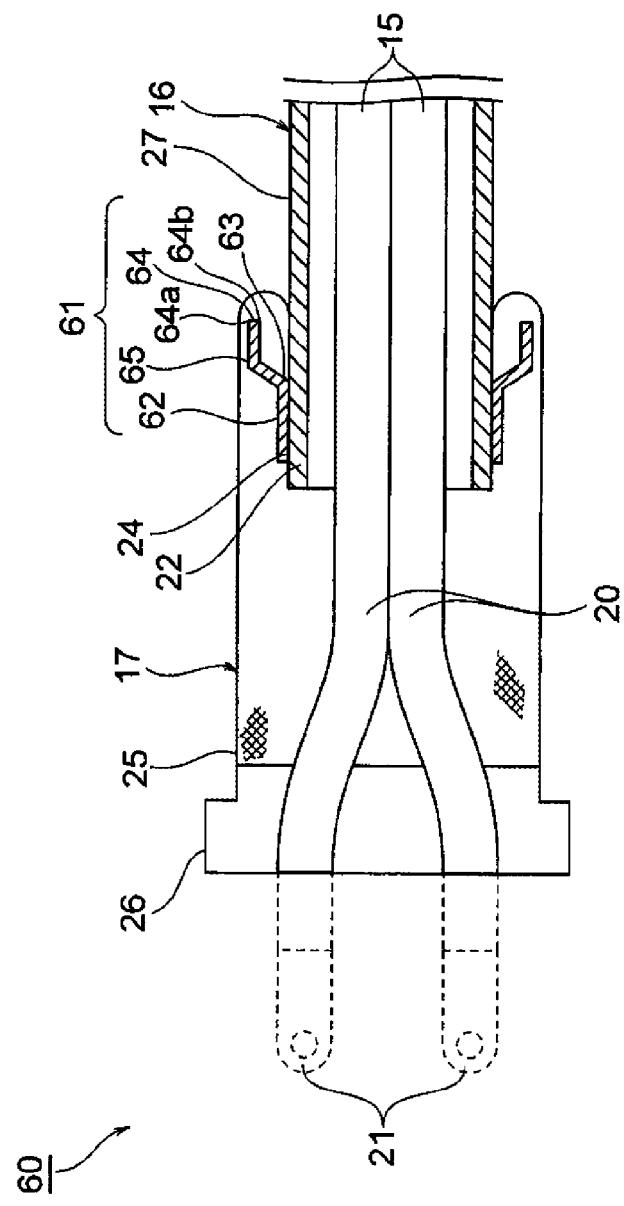
FIG. 10 is a sectional view showing another configuration of one end of the wire harness (Fourth Embodiment).

In addition to the wire harness of the first embodiment, the present invention may employ a wire harness according to any one of the following second to fourth embodiments. In a wire harness 40 according to a second embodiment, a crimping member 41 is formed to have a substantially L shaped cross-section (see FIG. 8). In a wire harness 50 according to a third embodiment, a crimping member 51 is formed to have a substantially J shaped cross-section (see FIG. 9). In a wire harness 60 according to a fourth embodiment, a crimping member 61 is formed to have a substantially crank-shaped cross-section (see FIG. 10). In addition, the crimping member 51 having the substantially J shaped cross-section is formed by metal such as iron, copper, stainless, etc.

According to the second to fourth embodiments, not only the same effects as the first embodiment but also additional effects can be achieved. Particularly, according to the second and third embodiments, since the crimping members 41, 51 are formed to have the substantially L shaped cross-section and the substantially J shaped cross-section, respectively, the braided shielding members 17, 18 do not come into direct contact with edges 44a, 44b, 54a, 54b of free ends 44, 54 of extending portions 45, 55 even when the braided shielding members 17, 18 are pulled. As a result, it is possible not only to prevent damage to the portions of the braided shielding members 17, 18 brought into contact with the bent portions 43, 53 but also to mitigate damage to the other portions of the braided shielding members 17, 18. Accordingly, it is possible to more reliably prevent cutting of the braided shielding members 17, 18.

In addition, it is, of course, that the present invention can be variously modified and implemented in a range without changing the gist of the invention.

A wire harness according to the present invention is capable of preventing the cutting of a braided shielding member.

What is claimed is:

1. A wire harness comprising:
one or more electrically-conducting paths;
a tubular shielding member configured to collectively accommodate the electrically-conducting paths;
a braided shielding member having a cylindrical shape; and
an annular crimping member including a fixing portion which fixedly connects the braided shielding member and the tubular shielding member by crimping, wherein
the braided shielding member includes
  a crimped portion which is crimped to the tubular shielding member by the crimping member,
  a folded portion which is reversely folded back from the crimped portion to outside in a radial direction of the tubular shielding member, and
  a surrounding portion which extends from the folded portion at the outside of the crimping member so as to surround a portion of the electrically-conducting paths extending from an end of the tubular shielding member, and
  one end portion of the crimping member at a side opposite to the end of the tubular shielding member is bent to the outside in the radial direction toward the surrounding portion and within the folded portion of the braided shield member.

2. The wire harness according to claim 1, wherein the crimping member has a substantially dog-leg shaped cross-section, a substantially L shaped cross-section, a substantially J shaped cross-section or a substantially crank-shaped cross-section.

3. The wire harness according to claim 1, wherein the crimping member is bent into a substantially arcuate cross-section so that no edges are formed on an inner surface of the crimping member.

4. The wire harness according to claim 1, wherein the one end portion is a free end of the crimping member.

5. The wire harness according to claim 4, wherein a second end portion of the crimping member, in a direction in which the one or more electrically-conducting paths extend from the end of the tubular shielding member, is a second free end of the crimping member.

6. The wire harness according to claim 5, wherein the crimping member extends in the direction from the second end portion substantially flat along the braided shielding member crimped to the tubular shielding member until a bent portion of the crimping member at which the one end portion is bent in the radial direction.

7. The wire harness according to claim 1, wherein the crimping member is separate from the tubular shielding member.

8. The wire harness according to claim 1, wherein the one end portion of the crimping member which is bent to the outside in the radial direction toward the surrounding portion is disposed close to a longitudinal center of the tubular shielding member than the fixing portion.

9. The wire harness according to claim 1, wherein the tubular shielding member is a metal pipe, and the metal pipe longitudinally ends within the surrounding portion.

10. The wire harness according to claim 9, wherein the annular crimping member presses the crimped portion into the metal pipe, and the braided shielding member extends from the folded portion and is attached to a shield shell into which the one or more electrically-conducting paths are extended.

* * * * *